(12) United States Patent
Wakita et al.

(10) Patent No.: US 9,233,640 B2
(45) Date of Patent: Jan. 12, 2016

(54) LEVER SWITCH DEVICE

(75) Inventors: Hidekazu Wakita, Tokyo (JP); Hisashi Matsuhashi, Tokyo (JP)

(73) Assignee: Niles Co., LTD. (JP)

( * ) Notice: Subject to any disclaimer, the term of this patent is extended or adjusted under 35 U.S.C. 154(b) by 332 days.

(21) Appl. No.: 13/583,493

(22) PCT Filed: Mar. 25, 2011

(86) PCT No.: PCT/JP2011/001763
§ 371 (c)(1),
(2), (4) Date: Sep. 7, 2012

(87) PCT Pub. No.: WO2011/121958
PCT Pub. Date: Oct. 6, 2011

(65) Prior Publication Data
US 2013/0001056 A1   Jan. 3, 2013

(30) Foreign Application Priority Data

Mar. 31, 2010   (JP) .................................. 2010-084367

(51) Int. Cl.
*H01H 25/00* (2006.01)
*B60Q 1/14* (2006.01)
*H01H 21/50* (2006.01)

(52) U.S. Cl.
CPC ............ *B60Q 1/1469* (2013.01); *B60Q 1/1461* (2013.01); *H01H 21/50* (2013.01)

(58) Field of Classification Search
CPC ....... H01H 21/50; H01H 21/54; H01H 25/00; H01H 21/00; B60Q 1/1469; B60Q 1/1461
USPC .................................. 200/337, 61.27, 61.54
See application file for complete search history.

(56) References Cited

U.S. PATENT DOCUMENTS 5,780,794 A   7/1998   Uchiyama et al.
5,804,784 A   9/1998   Uchiyama et al.
(Continued)

FOREIGN PATENT DOCUMENTS

EP   1 428 721 A2   6/2004
JP   11-250772   9/1999
(Continued)

OTHER PUBLICATIONS

Japanese Office Action issued in Apr. 16, 2013 for corresponding Japanese Application No. 2011-267672.
International Search Report; International Application No. PCT/JP2011/001763; Dated: Jun. 2, 2011.
(Continued)

*Primary Examiner* — Renee Luebke
*Assistant Examiner* — Lheiren Mae A Caroc
(74) *Attorney, Agent, or Firm* — Fishman Stewart Yamaguchi PLLC

(57) ABSTRACT

The objective is to reduce the size of a lever switch device. Disclosed is a lever switch device provided with a restriction wall (49) which is formed between first and second arms (19, 23) and which restricts the movement of the first and second arms (19, 23) against the rotation of first and second levers (13, 15) relative to a movable body (31); and engagement walls (45a, 45b, 47a, 47b) which are formed on first and second fitting portions (45, 47) and which are engaged with the first and second arms (19, 23) by the rotational transfer of the first and second arms (19, 23) caused by the shaft rotation of the first and second levers (13, 15), to cause first and second movable boards (41, 43) to perform a contact operation.

6 Claims, 11 Drawing Sheets

(56) References Cited

U.S. PATENT DOCUMENTS

| | | | |
|---|---|---|---|
| 5,859,396 A * | 1/1999 | Yokoyama | 200/61.54 |
| 6,025,565 A * | 2/2000 | Miyase et al. | 200/61.28 |
| 7,019,226 B2 * | 3/2006 | Otani et al. | 200/16 D |
| 2009/0145735 A1 | 6/2009 | Kimura et al. | |

FOREIGN PATENT DOCUMENTS

| | | |
|---|---|---|
| JP | 2000-348572 | 12/2000 |
| JP | 2006-185732 | 7/2006 |
| JP | 2009-140773 A | 6/2009 |

* cited by examiner

LEVER SWITCH DEVICE

TECHNICAL FIELD

The present invention relates to a lever switch device for performing a contact control for motor vehicle headlamps.

BACKGROUND ART

As a conventional lever switch device, there is a lever switch device shown in FIGS. 10 and 11. FIG. 10 is an exploded perspective view showing an assembling relation of a lever switch device, and FIG. 11 is a sectional view showing the periphery of a switch unit of the lever switch device.

A lever switch device 101 shown in FIGS. 10 and 11 is designed to issue electric controlling instructions and includes, for example, functions of a turn signal switch, a flash-to-pass switch, a main beam and dipped beam switching or dimmer switch and a wiper and washer switch.

The lever switch device 101 includes a control lever 103 and a switch unit 105, and the switch unit 105 is mounted on a body 106 side which is fixed to a steering column 104.

The control lever 103 includes a first, second, and third levers 109, 107, 111.

The first lever 109 has a rotary knob 112 which is fixed to one end and a first control rod 113 which is mounted at the other end side thereof. The second lever 107 has a stationary knob 114 which is mounted at one end and a click element supporting tube 115 which is integrally formed at the other end thereof. A second control rod 117 is provided on the click member supporting tube 115.

The third lever 111 is disposed rotatably on an outer circumferential side of the first lever 109 and includes a third control rod 119 at a distal end side thereof.

In addition, the lever switch device 101 includes a click spring 121 and a click element 123.

In the switch unit 105, a movable element 127 is disposed within a case 125 and is supported rotatably by a shaft 127a. A fourth control rod 129 is provided on this movable element 127. The first lever 109 is supported rotatably on the movable element 127 by a shaft 107a. A pole plate 131 is disposed in a lower portion of the case 125. A plurality of fixed contacts are provided on an upper surface side of the pole plate 131. A first movable plate 133, a second movable plate 135, a third movable plate 137 and a fourth movable plate 139 are disposed on the pole plate 131. The first, third and fourth movably plates 133, 137, 139 are disposed in a direction which intersects a lever axis of the control lever 103 (in FIG. 11, in a direction which is at right angles to a surface of a sheet of paper on which FIG. 11 is drawn) so as to move rectilinearly. The second movable plate 135 is disposed in the direction of the lever axis (in FIG. 11, in a left-to-right direction) so as to move rectilinearly.

Headlamps are turned on and off by rectilinear movements of the first movable plate 133. The headlamps are switched between main beams and dipped beams and are turned on for flash-to-pass sign by rectilinear movements of the second movable plate 135. Fog lamps are turned on and off by rectilinear movements of the third movable plate 137. Direction indicator lamps are turned on to flash by rectilinear movements of the fourth movable plate 139.

Engagement portions 141, 143, 145 are provided on the first, third and fourth movable plates 133, 137, 139 so as to cause the first, second, third and fourth movable plates 133, 135, 137, 139 to move rectilinearly, and a hole portion 147 is provided in the second movable plate 135.

Additionally, for example, when the first lever 109 is controlled to turn on its axis by controlling the rotary knob 112, the first control rod 113 is caused to move in a linked fashion. The first control rod 113 imparts an engaging force to the engagement portion 141, whereby the first movable plate 133 moves in the lever axis intersecting direction. By this movement, the headlamps are turned on and off. The movement of the third movable plate 137 as a result of rotational control of the third lever 111 on its axis is similar.

The second movable plate 135 moves rectilinearly in the lever axis direction via the second control rod 117 when the control lever 103 is controlled to swing about the shaft 107a to switch the headlamps between the main beams and the dipped beams and to turn on the headlamps to give a flash-to-pass sign.

As this occurs, the first control rod 113 and the third control rod 119 move in directions which follow the engagement portions 141, 143, and therefore, the first and third movable plates 133, 137 do not move.

The fourth movable plate 139 moves rectilinearly in the lever axis intersecting direction via the fourth control rod 129 when the control lever 103 is controlled to swing about the shaft 127a to flash the direction indicator lamps.

As this occurs, the first and third control rods 113, 119 move in the direction which intersects the surface of the sheet of paper at right angles in which the first and third control rods 113, 119 are brought into engagement with the engagement portions 141, 143. However, clearance is set for the engagement portions 141, 143 in the same direction, whereby the first and third control rods 113, 119 are not brought into engagement with the engagement portions 141, 143, and therefore, the first and third movable plates 133, 137 do not move.

In this way, the various lever controls can be performed smoothly.

In the construction that has been described heretofore, however, a large distance has to be ensured between the axial center of the shaft 127a and the third control rod 119 which is disposed rearwards in the lever axis direction so as for them to be spaced apart largely in order to avoid the interference of the first control rod 113 and the third control rod 119 with the third movable plate 137 (the engagement portion 143), the first movable plate 133 (the engagement portion 141), respectively, which occurs when the control lever 103 is controlled to swing about the shaft 107a.

This causes a problem that a width of the switch unit 105 in the lever axis direction is increased.

Further, when the control lever 103 is controlled to swing about the shaft 127a, a distance over which the third control rod 119 moves rectilinearly in the lever axis intersecting direction (in the direction which intersects the surface of the sheet of paper at right angles) becomes larger by such an extent that the third control rod 119 is spaced away from the axial center of the shaft 127a than when the third control rod 119 is disposed adjacent to the axial center of the shaft 127a.

Because of this, a distance between the position where the third control rod 119 moves and the position where a fixed contact is disposed which is connected to and disconnected from the third movable plate 137 which is actuated as a result of rotational control of the third lever 111 is increased so that the two positions are spaced far apart by such an extent that the third control rod 119 is spaced apart from the axial center of the shaft 127a. Thus, there is possibility that the contact action of the third movable plate 137 by the rotational control of the third lever 111 is not brought about in a stable fashion.

Then, in order to ensure the contact action of the third movable plate 137 by the rotational control of the third lever 111, it is considered that the third control rod 119 is extended to ensure the moving distance of the third movable plate 137. However, in case this configuration is adopted, there is caused a problem that the height of the switch unit 105 in a vertical direction in FIG. 11 is increased.

CITATION LIST

Patent Literature

Patent Literature 1: JP-A-11-250772

SUMMARY OF INVENTION

Technical Problem

The increase in size of the lever switch device is a problem to be solved.

Solution To Problem

With a view to realizing a reduction in size of such a lever switch device, according to the invention, there is provided a lever switch device comprising a movable element which is supported rotatably in a case, first and second movable plates which are disposed so as to move along a pole plate on the case side in a direction which intersects a rotational axial center of the movable element at right angles to thereby be caused to perform a contacting action relative to the pole plate, and first and second levers which are supported so as to swing and rotate freely and disposed so as to rotate about axes thereof in a concentric fashion on the movable element, characterized mainly by comprising first and second fitting portions which are provided on the first and second movable plates and which lie adjacent across the rotational axial center of the movable element, first and second arms in which proximal portions are supported on the first and second levers so as to rotate on axial center thereof which are at right angles to lever axes of the first and second levers along the lever axes and so as not to rotate about the lever axes, and distal end portions lie adjacent across the rotational axial center of the movable element and fit in the first and second fitting portions, a restriction wall which is formed between the first and second arms so as to restrict the first and second arms from moving in the direction of the lever axes against the rotation of the first and second levers relative to the movable element, and engagement walls which are formed on the first and second engagement portions so as to be brought into engagement with the first and second arms as a result of rotational movement of the first and second arms by axial rotation of the first and second levers to thereby cause the first and second movable plates to perform the contacting action.

Advantageous Effects of Invention

According to the invention, by adopting the means described above, the distal end portions where the first and second arms fit in the first and second fitting portion can be laid close to the rotational axis of the movable element, thereby making it possible to make the lever switch device smaller in size.

DESCRIPTION OF EMBODIMENTS

The object to make the lever switch device smaller in size is realized by providing the first and second fitting portions which are provided on the first and second movable plates and which lie adjacent across the rotational axial center of the movable element, the first and second arms in which proximal portions are supported on the first and second levers so as to rotate on axial center thereof which are at right angles to lever axes of the first and second levers along the lever axes and so as not to rotate about the lever axes, and distal end portions lie adjacent across the rotational axial center of the movable element and fit in the first and second fitting portions, the restriction wall which is formed between the first and second arms so as to restrict the first and second arms from moving in the direction of the lever axes against the rotation of the first and second levers relative to the movable element, and the engagement walls which are formed on the first and second engagement portions so as to be brought into engagement with the first and second arms as a result of rotational movement of the first and second arms by axial rotation of the first and second levers to thereby cause the first and second movable plates to perform the contacting action.

Embodiment 1

Schematic Configuration

Figure 1:
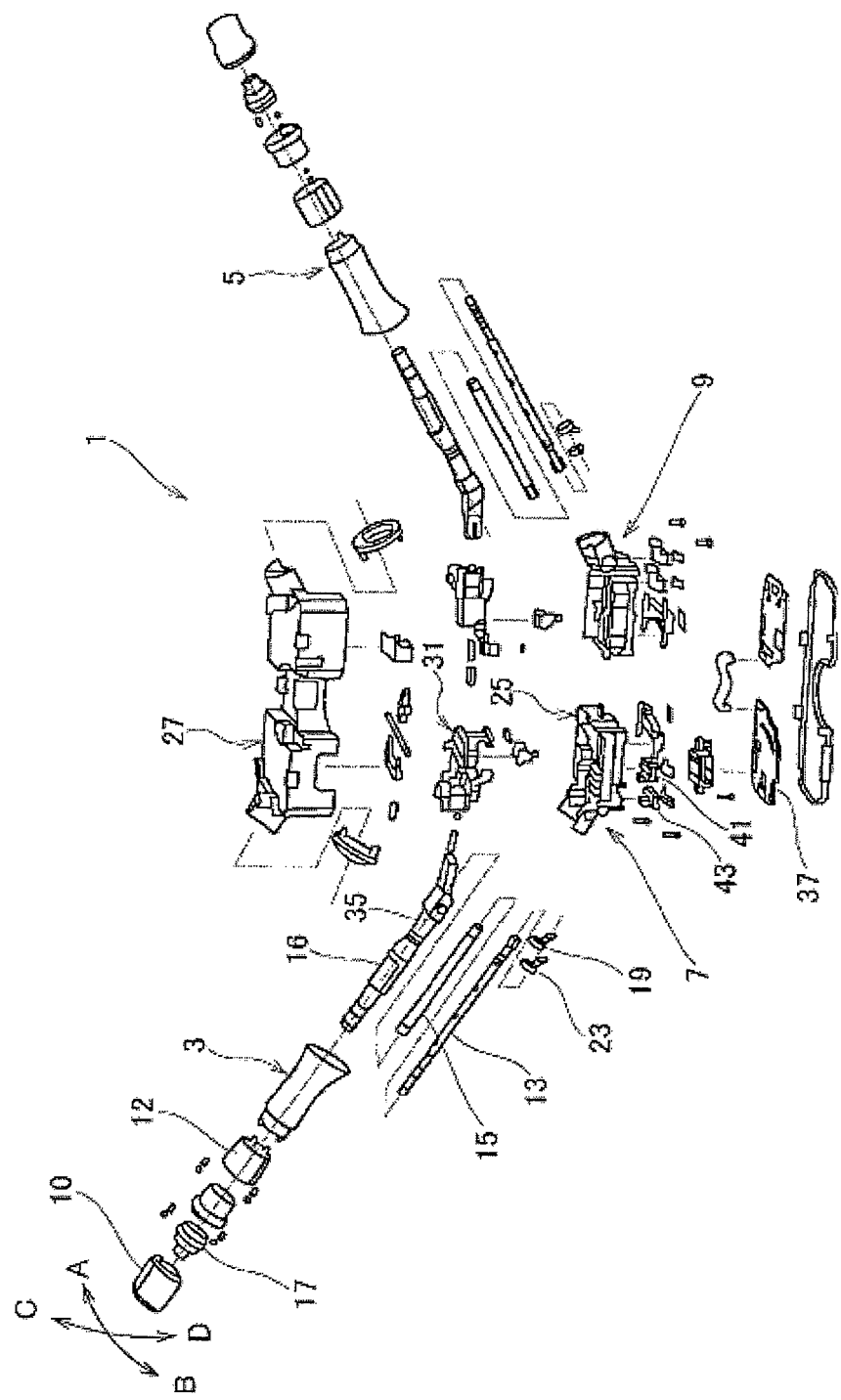
FIG. 1 is an overall exploded perspective view showing left and right lever switch devices in an assembling relation. (Embodiment 1)

FIG. 1 is an overall exploded perspective view showing an assembling relation of a lever switch device to which Embodiment 1 of the invention is applied.

A lever switch device 1 shown in FIG. 1 is designed to issue electric controlling instructions and includes, for example, functions of a turn signal switch, a flash-to-pass switch, a main beam and dipped beam switching or dimmer switch and a headlamp switch.

The lever switch device 1 includes control levers 3, 5 and switch units 7, 9, and the switch units 7, 9 are mounted on a body side which is fixed to a steering column.

Here, the embodiment of the invention will be described by reference to the control lever 3 and the switch unit 7.

Figure 2:
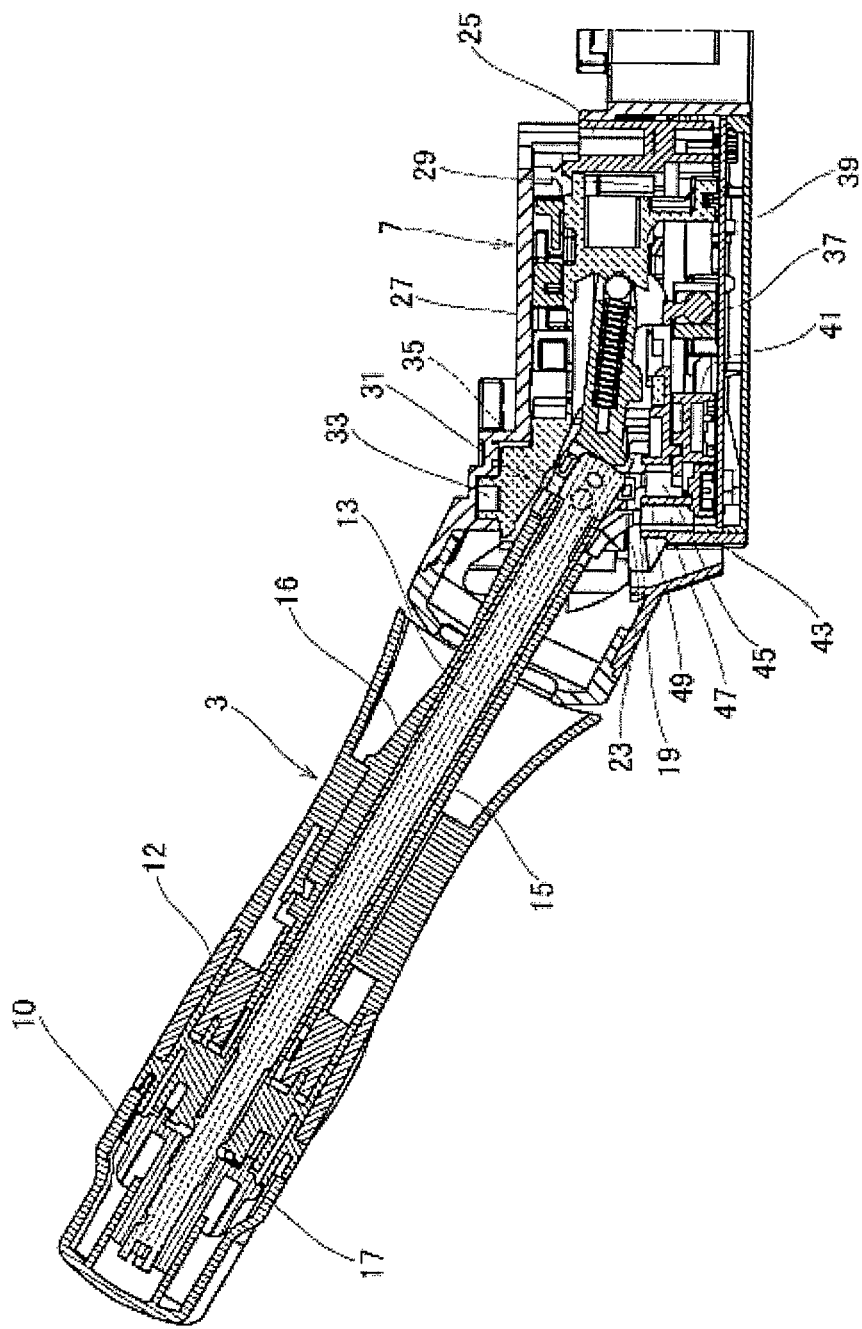
FIG. 2 is a sectional view of a control lever and a switch unit. (Embodiment)
Figure 3:
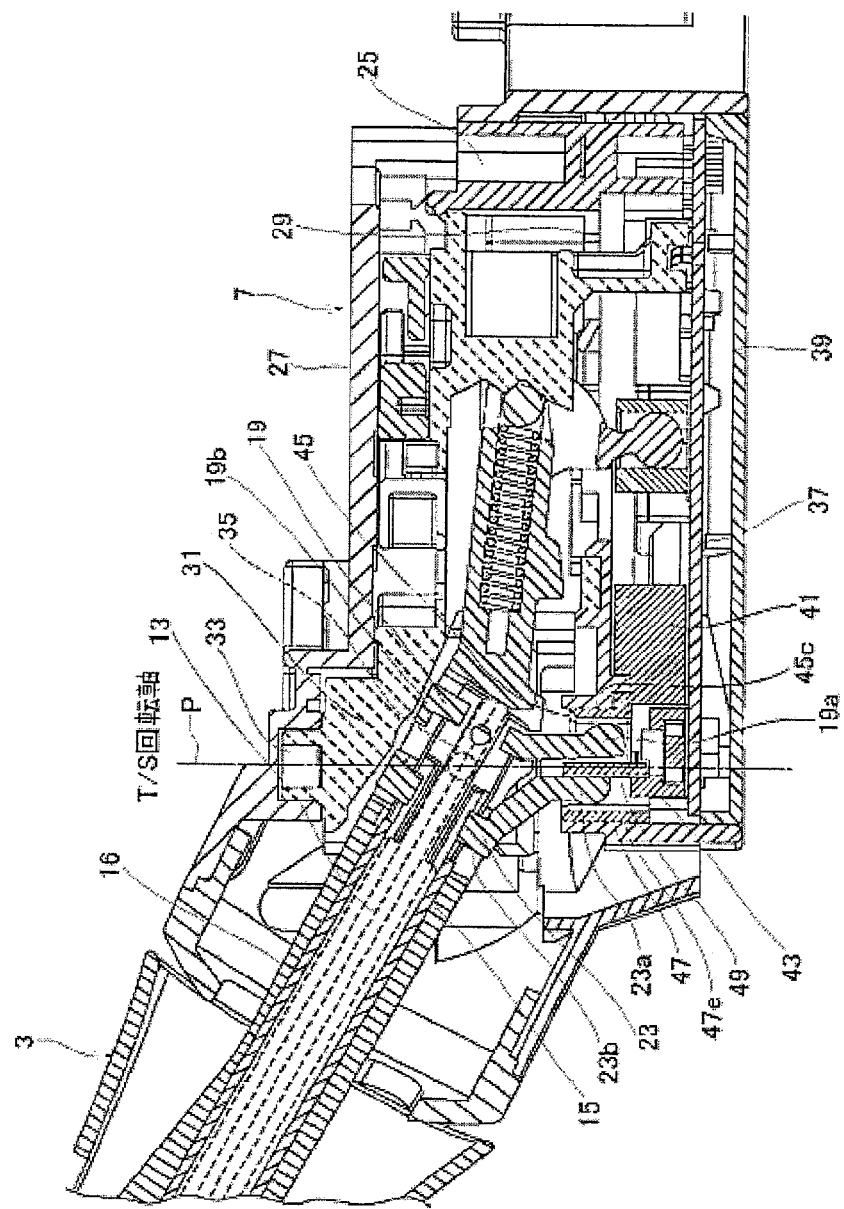
FIG. 3 is an enlarged sectional view of a main part. (Embodiment 1)

FIG. 2 is a sectional view of the control lever and the switch unit, and FIG. 3 is an enlarged sectional view of a main part.

As shown in FIG. 1, the control lever 3 swings freely in directions indicated by arrows A, B (directions following a steering wheel) and in directions indicated by arrows C, D (directions following a steering column).

The control lever 3 has a function as a turn signal switch, for example, and hence, when it is controlled in the direction indicated by the arrow A or B, a turn signal is turned on to flash. The control lever 3 also has a function as a flash-to-pass switch, for example, and hence, when it is controlled to move to an extremity in the direction indicated by the arrow C, headlamps are turned on temporarily. The control lever 3 has also a function as a main beam and dipped beam switching or dimmer switch, for example, and hence, when it is controlled normally in the direction indicated by the arrow C or D, the headlamps are switched between main beams and dipped beams. The control lever 3 has a function as a headlamp switch, for example. When a first rotary knob 10 is controlled, for example, the headlamps and side lamps are turned on and off, and when a second rotary knob 12 is controlled, for example, fog lamps are turned on and off.

The control lever 3 includes a first lever 13 and a second lever 15 which is hollow so that the first lever 13 is disposed so as to pass therethrough in a concentric fashion. The first and second levers 13, 15 are control shafts which move movable plates, which will be described later, along a pole plate. Note that the first and second levers 13, 15 are disposed concentrically with a third lever 16.

The first rotary knob 10 is mounted at one end of the first lever 13 via a click block 17, and a first arm 19 is mounted at the other end side thereof. The second rotary knob 12 is mounted at one end of the second lever 15, and a second arm 23 is mounted at the other end side thereof.

The switch unit 7 includes a case 25 and a case cover 27 which is fittingly attached to an upper side of the case 25. As shown in FIGS. 2, 3, a partition wall 29 is provided within the case 25, and a movable element 31 is disposed on one side of the partition wall 29. A shaft 33 at an end portion of the movable element 31 is rotatably supported on the case cover 27. The control lever 3 is supported rotatably in the direction indicated by the arrow C or D relative to the movable element 31 by a shaft 35 formed on the third lever 16.

A rotational axial center of the movable element 31 constitutes a swing center of the control lever 3 when actuating the turn signal switch and is referred to as a T/S rotational axis P.

A pole plate 37 is disposed on a lower side of the partition wall 29. A plurality of fixed contacts are provided on an upper surface side of the pole plate 37. Elements such as diodes are mounted on a lower surface side of the pole plate 37. An under cover 39 is provided on a lower side of the pole plate 37.

A first movable plate 41 and a second movable plate 43 are disposed on the pole plate 37 on the under side of the partition wall 29. The first and second movable plates 41, 43 are both disposed so as to move rectilinearly in parallel in the direction which follows the steering wheel (in FIGS. 2 and 3, a direction which is at right angles to surfaces of sheets of paper on which the figures are drawn).

When the first movable plate 41 moves rectilinearly, the headlamps are turned on and off, and when the second movable plate 43 moves rectilinearly, the fog lamps are turned on and off.

First and Second Arms and First and Second Movable Plates

Figure 4:
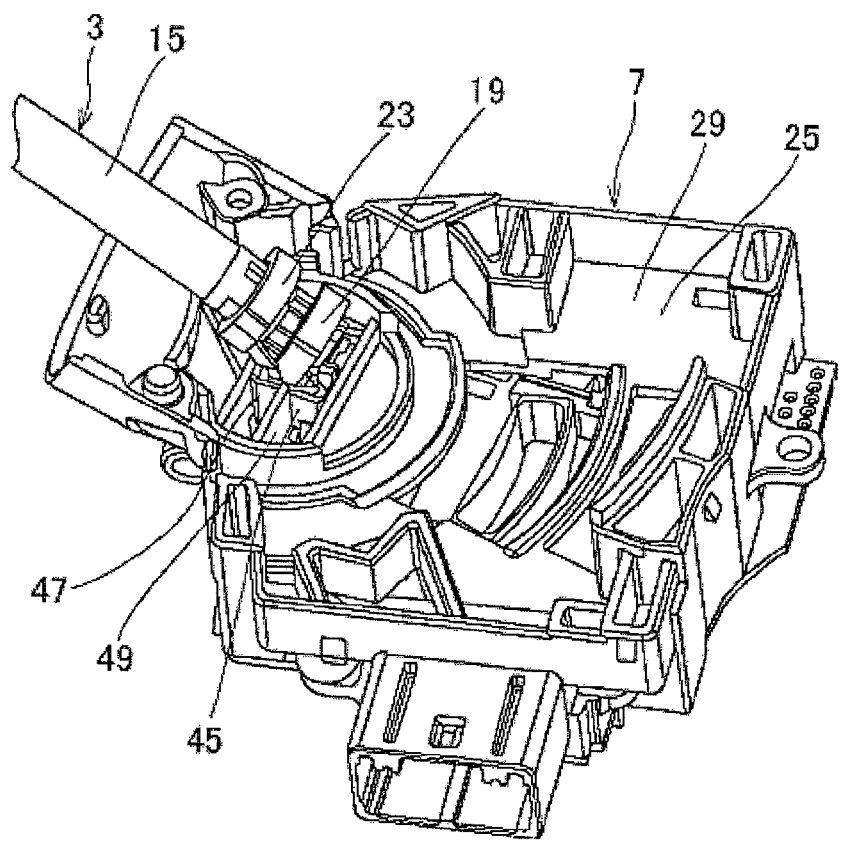
FIG. 4 is a perspective view of the main part with a case cover removed. (Embodiment)
Figure 5:
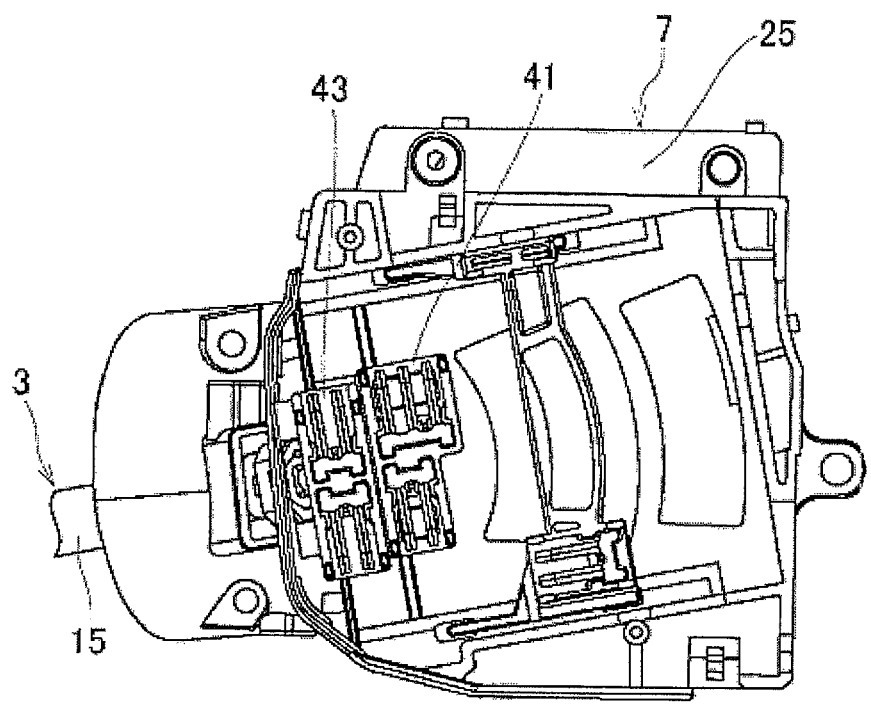
FIG. 5 is a bottom view of the main part with a pole plate and an undercover removed. (Embodiment 1)
Figure 6:
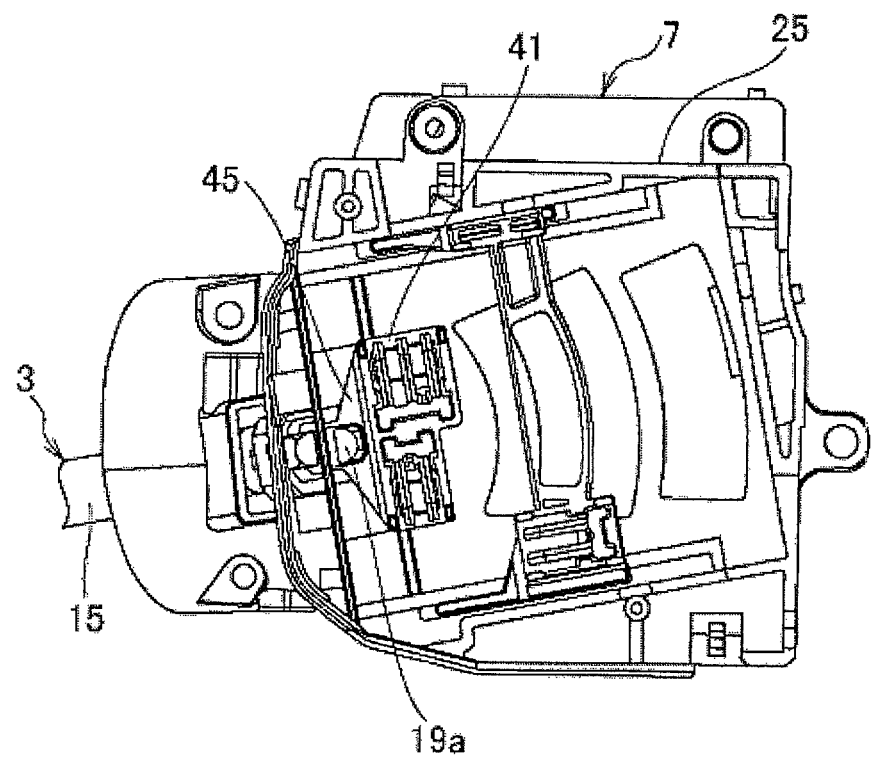
FIG. 6 is a bottom view of the main part with the pole plate, the undercover and a second movable plate removed. (Embodiment 1)
Figure 7:
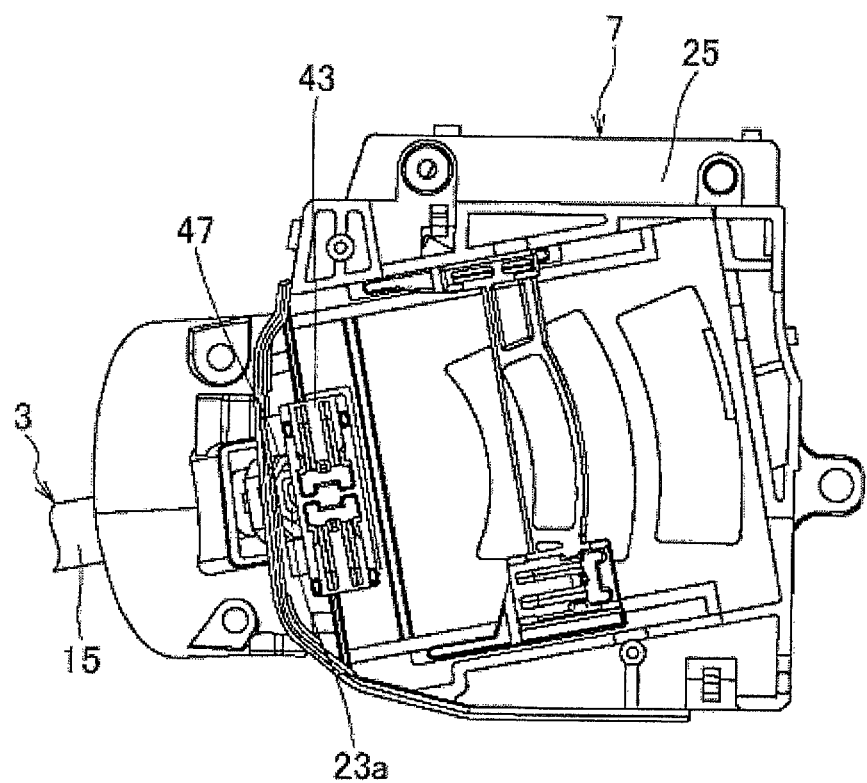
FIG. 7 is a bottom view of the main part with the pole plate, the undercover and a first movable plate removed. (Embodiment 1)

FIG. 4 is a perspective view of the main part with the case cover and the movable element removed. FIG. 5 is a bottom view of the main part with the pole plate and the undercover removed. FIG. 6 is a bottom view of the main part with the pole plate, the undercover and the second movable plate removed. FIG. 7 is a bottom view of the main part with the pole plate, the undercover and the first movable plate removed.

As shown in FIGS. 3 to 7, first and second fitting portions 45, 47 are formed integrally on the first and second movable plates 41, 43, respectively. The first and second fitting portions 45, 47 are disposed so as to be offset towards the T/S rotational axis P side relative to the first and second movable plates 41, 43.

Figure 8:
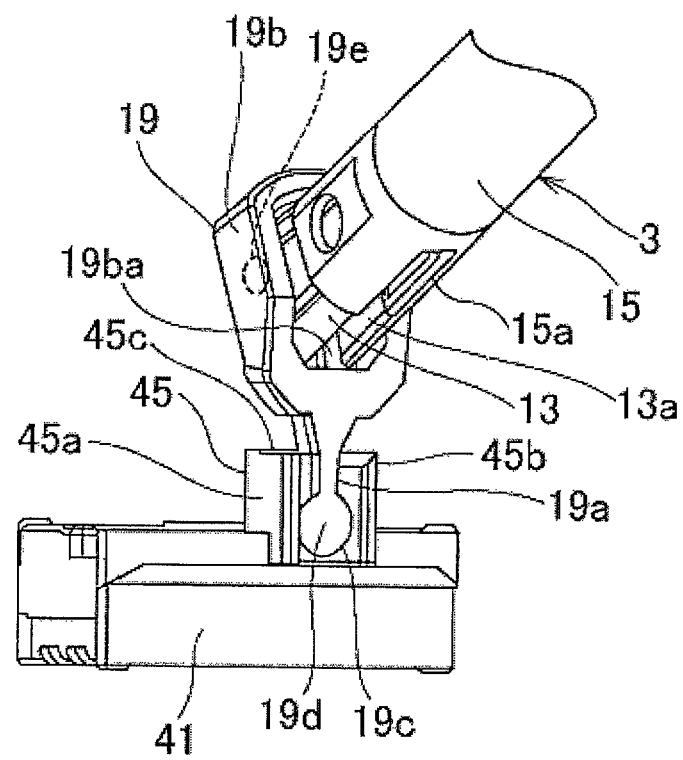
FIG. 8 is a perspective view as seen from a first and second levers' side, showing a relation between a first arm and the first movable plate. (Embodiment 1)
Figure 9:
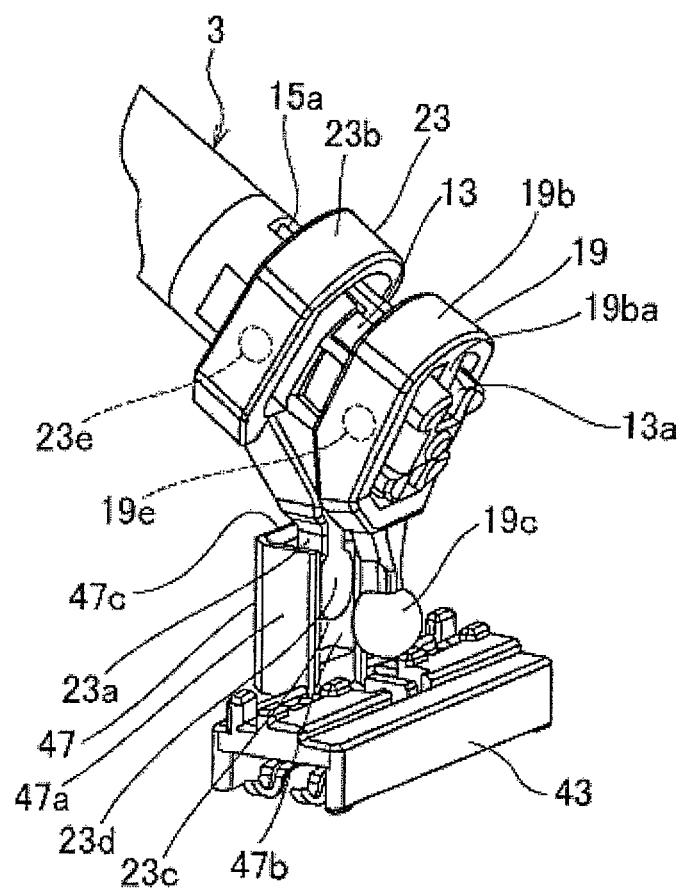
FIG. 9 is a perspective view as seen from an opposite side to the first and second levers' side, showing a relation between the first and second arms and the second movable plate. (Embodiment 1)
Figure 10:
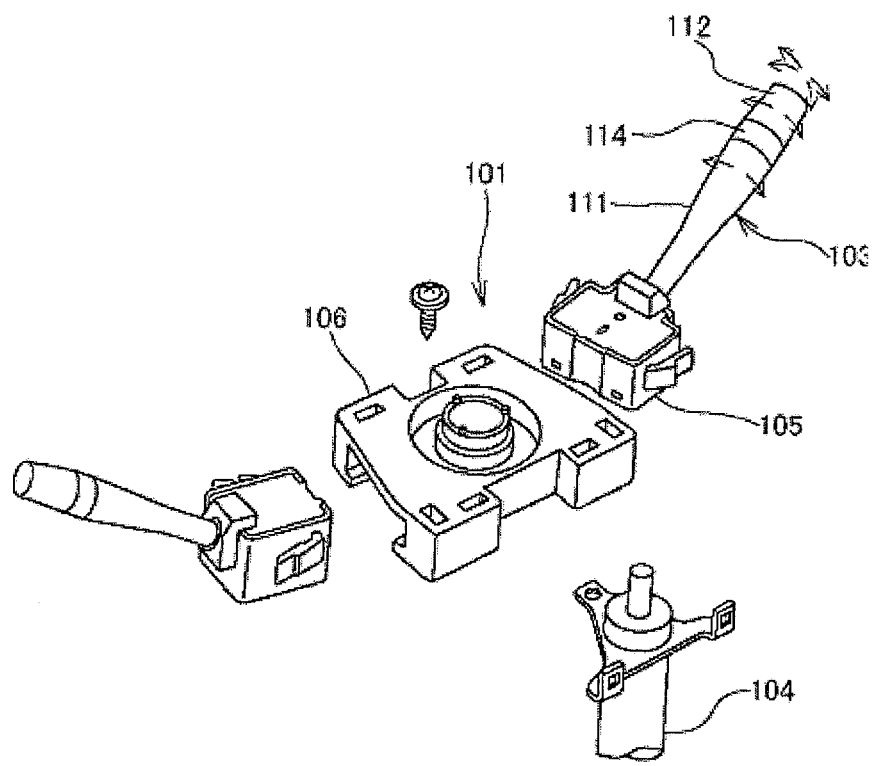
FIG. 10 is an exploded perspective view showing an assembling relation of a lever switch device. (Conventional Example)
Figure 11:
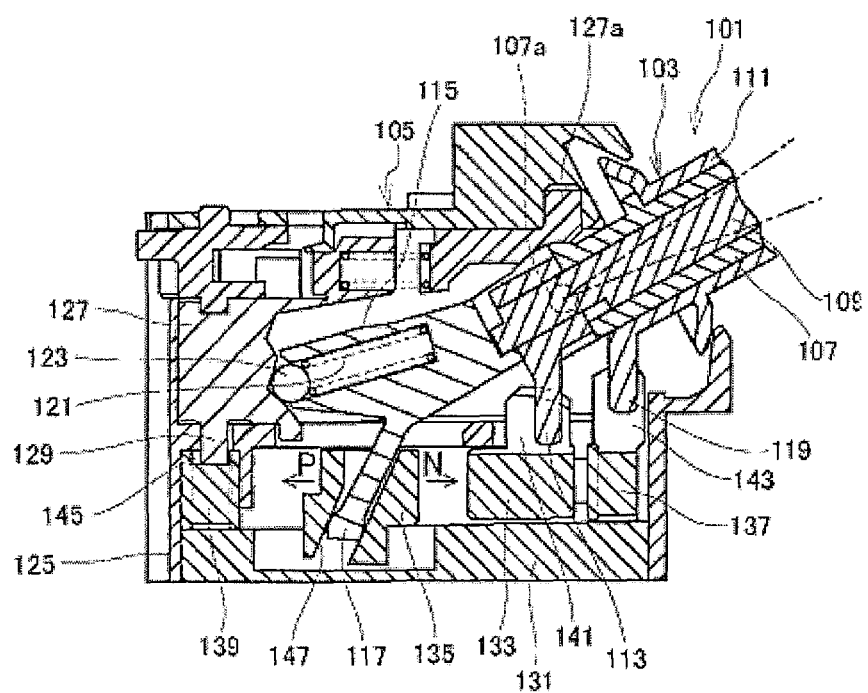
FIG. 11 is a sectional view showing the periphery of a switch unit of the lever switch device. (Conventional Example)

The first and second fitting portions 45, 47 have a sectional shape which is opened on one side and is surrounded on three sides. As shown in FIGS. 8 and 9, both walls of the first and second fitting portions 45, 47 constitute first and second engagement walls 45a, 45b, 47a, 47b in a direction in which the first and second movable plates 41, 43 move rectilinearly.

The first and second fitting portions 45, 47 have sectional shapes which are surrounded on three sides by the first and second engagement walls 45a, 45b, 47a, 47b and walls 45c, 47c, with open sides facing a restriction wall 49 formed on the case 25, and the first and second fitting portions 45, 47 are disposed adjacent to each other. The walls 45c, 47c are disposed so as to face the restriction wall 49 with space defined therebetween.

Note that the restriction wall 49 can be formed integrally on either of the first and second fitting portions 45, 47 or restriction walls 49 can be formed on both the first and second fitting portions 45, 47.

Thus, the first and second fitting portions 45, 47 lie adjacent to each other across the restriction wall 49.

First and second distal end portions 19a, 23a of the first and second arms 19, 23 fit in the first and second fitting portions 45, 47.

The restriction wall 49 is disposed on the T/S rotational axis P of the movable element 31 between the first and second arms 19, 23. The restriction wall 49 restricts the first and second arms 19, 23 from moving as a result of rotation (rotation in the direction following the steering column) of the first and second levers 13, 15 about the shaft 35 relative to the movable element 31.

FIG. 8 is a perspective view as seen from a first and second levers' side, showing a relation between the first arm and the first movable plate. FIG. 9 is a perspective view as seen from an opposite side to the first and second levers' side, showing a relation between the first and second arms and the second movable plate.

As shown in FIGS. 3 and 8, the first arm 19 is such that a first proximal portion 19b having a frame shape is formed integrally at the first distal end portion 19a. A first semi-spherical portion 19c, which is cut on a side lying adjacent to the second distal end portion 23a, is provided at the first distal end portion 19a. A side of the first distal end portion 19a which lies adjacent to the second distal end portion 23a and which includes the first semi-spherical portion 19c is formed into a flat pane portion 19d. This flat plane portion 19d faces the restriction wall 49 across the T/S rotational axis P.

The first proximal portion 19b has the frame shape, and a rib 19ba is provided in the center thereof. An outer circumference of a distal end of the second lever 15 and an outer circumference of a distal end of the first lever 13 which projects from the second lever 15 are both formed into a rectangular shape, slits 15a, 13a are provided therein.

The first proximal portion 19b of the first arm 19 fits on the distal end of the first lever 13, and the rib 19ba fits in the slit 13a. By mounting the first arm 19 on the first lever 13 in this way, the first arm 19 is prevented from rotating around an axis of the first lever 13.

The first proximal portion 19b of the first arm 19 is supported rotatably at the distal end of the first lever 13 via a pivot 19e.

The first arm 19 is prevented from rotating relative to the first lever 13 by the fitment of the first proximal portion 19b on the distal end of the first lever 13 and is supported rotatably by the pivot 19e, whereby the first arm 19 is mounted on the first lever 13 so as to rotate along a lever axis of the first lever 13 and so as not to rotate around the lever axis.

Note that the first arm 19 can also be prevented from rotating around the axis of the first lever 13 only through fitting engagement between the pivot 19e of the first proximal portion 19b and the first lever 13. However, it is considered that the fitting engagement is disengaged due to load applied to the fitting portion, and therefore, the rotation of the first arm 19 is prevented in an ensured fashion by causing the rib 19ba to fit in the slit 13a.

With the first arm 19 mounted on the first lever 13 in the way described above, the first distal end portion 19a of the first arm 19 fits in the first fitting portion 45 in the way described above. The first distal end portion 19a of the first arm 19 has clearance relative to the first engagement walls 45a, 45b of the first fitting portion 45 in a direction in which the first movable plate 41 moves rectilinearly.

As shown in FIGS. 3 and 9, the second arm 23 and the second fitting portion 47 are also formed similar to the first arm 19 and the first fitting portion 45.

On the second arm 23, a second proximal portion 23b having a frame shape is formed integrally at the second distal end portion 23a, and the second proximal portion 23b fits on the distal end of the second lever 15. A second semi-spherical portion 23c, which is cut on a side lying adjacent to the first distal end portion 19a, is provided at the distal end portion 23a of the second arm 23. A side of the second distal end portion 23a which lies adjacent to the first distal end portion 19a and which includes the second semi-spherical portion 23c is formed into a flat plane portion 23d which follows the T/S rotational axis P.

A fitting portion of the second arm 23 which fits on the second lever 15 is spaced apart from the T/S rotational axis P. The second arm 23 is bent substantially into a V-shape in section from the fitting portion where the second arm 23 fits on the second lever 15 towards the distal end of the second lever 15 so that the distal end portion 23a of the second arm 23 can be disposed in the fitting portion 47 of the second movable plate 43 in a position lying adjacent to the T/S rotational axis P.

Consequently, both the first arm 19 and the second arm 23 can fit in the fitting portions 45, 47 of the movable plates 41, 43 in the positions lying adjacent to the T/S rotational axis P. Moreover, the first arm 19 and the second arm 23 can be disposed substantially equidistant from the T/S rotational axis P.

By adopting this mounting configuration, the second arm 23 is prevented from rotating around the axis of the second lever 15.

The second proximal portion 23b of the second arm 23 is mounted rotatably at the distal end of the second lever 15 via a pivot 23e.

The second arm 23 is prevented from rotating relative to the second lever 15 by the fitment of the first proximal portion 23b on the distal end of the second lever 15 and is supported rotatably by the pivot 23e, whereby the second arm 23 is mounted on the second lever 15 so as to rotate along a lever axis of the second lever 15 and so as not to rotate around the lever axis.

With the second arm 23 mounted on the second lever 15 in the way described above, the second distal end portion 23a of the second arm 23 fits in the second fitting portion 47. The second distal end portion 23a of the second arm 23 has clearance relative to the second engagement walls 47a, 47b of the second fitting portion 47 in a direction in which the second movable plate 43 moves rectilinearly.

The semi-spherical portions 19c, 23c are designed the semi-spherical shape so that a uniform contact is ensured (a point contact can be made) with the walls 45c, 47c however the first and second arms 19, 23 may move when the control lever 3 is controlled in the direction indicated by the arrow C or D.

In this configuration, when the control lever 3 is controlled to move in the direction indicated by the arrow A or B to flash the turn signal lamp, the first and second distal end portions 19a, 23a of the first and second arms 19, 23 only turn slightly around the T/S rotational axis P and can move relatively within the slight clearance within the first and second fitting portions 45, 47.

Because of this, even when the control lever 3 is controlled to flash the turn signal lamp, there is no linkage in movement between the first and second movable plates 41, 43, and the first and second movable plates 41, 43 do not move rectilinearly.

When the control lever 3 is controlled to move in the direction indicated by the arrow C or D to switch the headlamps between main beams and dipped beams, the first and second arms 19, 23 are brought into engagement with the walls 45c, 47c of the first and second fitting portions 45, 47 and the restriction wall 49, whereby the movement of the first and second arms 19, 23 is restricted. An erroneous operation can be prevented by the first and second arms 19, 23 being so restricted.

As this occurs, the proximal portions 19b, 23b of the first and second arms 19, 23 are allowed to rotate relative to the first and second levers 13, 15 by the pivots 19e, 23e, whereby the control lever 3 can be controlled in the direction indicated by the arrow C or D easily with no reaction force applied thereto from the first and second movable plates 41, 43.

When the first rotary knob 10 is controlled, the first lever 13 rotates about the axis thereof, and the first arm 19 rotates together in a linked fashion. As the first arm 19 so rotates, the first distal end portion 19a moves more than the clearance given relative to the first fitting portion 45 to thereby be brought into engagement with the first engagement walls 45a, 45b so as to cause the first movable plate 42 to move rectilinearly.

The headlamps and side lamps can be turned on and off by the rectilinear movement of the first movable plate 41.

When the second rotary knob 12 is controlled, the second lever 15 rotates about the axis thereof, and the second arm 23 rotates together in a linked fashion. As the second arm 23 so rotates, the second distal end portion 23a moves more than the clearance given relative to the second fitting portion 47 to thereby be brought into engagement with the second engagement walls 47a, 47b so as to cause the second movable plate 43 to move rectilinearly.

The fog lamps can be turned on and off by the rectilinear movement of the second movable plate 43.

Advantage of the Embodiment

According to the embodiment of the invention, there is provided the lever switch device 1 comprising the movable element 31 which is supported rotatably in the case 25, the first and second movable plates 41, 43 which are disposed so as to move along the pole plate 37 on the case 25 side in the direction which intersects the rotational axial center of the movable element 31 at right angles to thereby be caused to perform the contacting action relative to the pole plate 37, and the first and second levers 13, 15 which are supported so as to rotate freely and disposed so as to rotate about axes thereof in a concentric fashion on the movable element 31, characterized by comprising the first and second fitting portions 45, 47 which are provided on the first and second movable plates 41, 43 and which lie adjacent across the rotational axial center of the movable element 31, the first and second arms 19, 23 in which the proximal portions 19b, 23b are supported on the first and second levers 13, 15 so as to rotate on the axial center thereof which are at right angles to the lever axes of the first and second levers 13, 15 along the lever axes and so as not to rotate about the lever axes, and the distal end portions 19a, 23a lie adjacent across the rotational axial center of the movable element 31 and fit in the first and second fitting portions 45, 47, the restriction wall 49 which is formed between the first and second arms 19, 23 so as to restrict the first and second arms 19, 23 from moving in the direction of the lever axes against the rotation of the first and second levers 13, 15 relative to the movable element 31, and the engagement walls 45a, 45b, 47a, 47b which are formed on the first and second engagement portions 45, 47 so as to be brought into engagement with the first and second arms 19, 23 as a result of rotational movement of the first and second arms 19, 23 by axial rotation of the first and second levers 13, 15 to thereby cause the first and second movable plates 41, 43 to perform the contacting action.

Because of this, the first and second distal end portions 19a, 23a where the first and second arms 19, 23 fit in the first and second fitting portions 45, 47 are allowed to lie close to the T/S rotational axis P, thereby making it possible to reduce a width of the switch unit 7 in the axial direction of the control lever 3.

Moreover, since the first and second distal end portions 19a, 23a where the first and second arms 19, 23 fit in the first and second fitting portions 45, 47 are allowed to lie close to the T/S rotational axis P, the length of the control rod does not have to be increased, although this was done in the related art lever switch device, in ensuring that the first and second movable plates 41, 43 perform the contacting action in association with the axial rotational control of the first and second levers 13, 15 by the first and second rotary knobs 10, 12 when the control lever 3 is controlled so as to control the first and second arms 19, 23 around the T/S rotational axis P, thereby making it possible to reduce a width of the switch unit 7 in a direction which is at right angles to the axial direction of the control lever 3.

The first semi-spherical portions 19c, 23c which are cut on the sides thereof which lie adjacent to each other are provided at the first distal end portions 19a, 23a of the first and second arms 19, 24, respectively.

Because of this, the first and second distal end portions 19a, 23a are allowed to lie close to the T/S rotational axis P. In addition, when the control lever 3 is controlled in the direction indicated by the arrow C or D, the first and second arms 19, 23 can operate between the walls 45c, 47c however the first and second arms 19, 23 may move, the control lever 3 can be controlled in the direction indicated by the arrow C or D easily with no reaction force applied thereto from the first and second movable plates 41, 43.

The walls are formed in the first and second fitting portions which face the restriction wall with the space defined therebetween.

Because of this, when the control lever 3 is controlled in the direction indicated by the arrow C or D, the movement of the first and second arms 19, 23 is restricted by the walls so formed, thereby making it possible to prevent the occurrence of an erroneous operation Namely, for example, when the control lever 3 is controlled in the direction indicated by the arrow D, the first arm 19 is prevented from being dislocated from the first fitting portion 45 in the lever axis direction by the wall. Therefore, even when the first rotary knob 10 (the control lever 3) is controlled to be rotated to a side lamp turning-on position in this condition, the first movable plate 41 operates to turn on the side lamps in an ensured fashion.

REFERENCE SIGNS LIST 1 lever switch device; 3, 5 control lever; 13 first lever; 15 second lever; 19 first arm; 19a distal end portion; 19b proximal portion; 23 second arm; 23a distal end portion; 23b proximal portion; 25 case; 31 movable element; 37 pole plate; 41 first movable plate; 43 second movable plate; 45 first fitting portion; 45a, 45b engagement wall; 45c wall; 47 second fitting portion; 47a, 47b engagement wall; 47c wall; 49 restriction wall; P T/S rotational axis

The invention claimed is:
1. A lever switch device comprising:
a movable element which is supported rotatably in a case;
first and second movable plates which are disposed so as to move along a pole plate on a case side in a direction which intersects a rotational axis of the movable element at right angles to thereby be caused to perform a contacting action relative to the pole plate; and
first and second levers which are supported so as to swing and rotate freely and disposed so as to rotate about axes thereof in a concentric fashion on the movable element, characterized by comprising:
first and second fitting portions which are provided on the first and second movable plates and which lie adjacent across the rotational axial center of the movable element;
first and second arms in which proximal portions are supported on the first and second levers so as to rotate on axial center thereof which are at right angles to lever axes of the first and second levers along the lever axes and so as not to rotate about the lever axes, and distal end portions lie adjacent across the rotational axial center of the movable element and fit in the first and second fitting portions;
a restriction wall which is formed between the first and second arms so as to restrict the first and second arms from moving in the direction of the lever axes against the rotation of the first and second levers relative to the movable element; and
engagement walls which are formed on first and second fitting portions so as to be brought into engagement with the first and second arms as a result of rotational movement of the first and second arms by axial rotation of the first and second levers to thereby cause the first and second movable plates to perform the contacting action.

2. A lever switch device as set forth in claim 1, characterized in that
semi-spherical portions are provided at the distal end portions of the first and second arms, the semi-spherical portions being cut on sides thereof where the semi-spherical portions lie adjacent to each other.

3. A switch lever system as set forth in claim 1, characterized in that
walls are formed in the first and second fitting portions, the walls being provided so as to face the restriction wall with space defined therebetween.

4. A lever switch device comprising:
a movable element which is supported rotatably in a case;
at least a first movable plate and a second movable plate which are disposed so as to move along a pole plate on a case side in a direction which intersects a rotational axis of the movable element at right angles to thereby be caused to perform a contacting action relative to the pole plate; and
at least first and second levers which are supported so as to swing and rotate freely and disposed so as to rotate about axes thereof in a concentric fashion on the movable element to thereby cause the at least first and second movable plates individually to perform a contacting action through axial rotation thereof, characterized in that
the at least first and second movable plates are disposed so as to overlap each other at least partially in a direction of a rotational axial center of the movable element as viewed in cross-section.

5. A lever switch device as set forth in claim 4, characterized by comprising:
fitting portions which are provided on the movable plates, which lie adjacent to each other across the rotational axis of the movable element and in which a plurality of arms fit which are provided on the plurality of levers along axes of the levers, and in that
the fitting portions are disposed in the position where the movable plates are overlapped.

6. A lever switch device as set forth in claim 4, wherein
the at least first and second movable plates include first and second fitting portions which lie adjacent across the rotational axial center of the movable element;
the at least first and second levers include first and second arms in which proximal portions are supported on the at least first and second levers so as to rotate an axial center thereof which are at right angles to lever axes of the at least first and second levers along the lever axes and so as not to rotate about the lever axes, and distal end portions lie adjacent across the rotational axial center of the movable element and fit in the first and second fitting portions; and the lever switch device further comprises:
a restriction wall which is formed between the first and second arms so as to restrict the first and second arms from moving in the direction of the lever axes against the rotation of the first and second levers relative to the movable element; and
engagement walls which are formed on the first and second fitting portions so as to be brought into engagement with the first and second arms as a result of rotational movement of the first and second arms by axial rotation of the first and second levers to thereby cause the at least first and second movable plates to perform the contacting action.

* * * * *